UNITED STATES PATENT OFFICE.

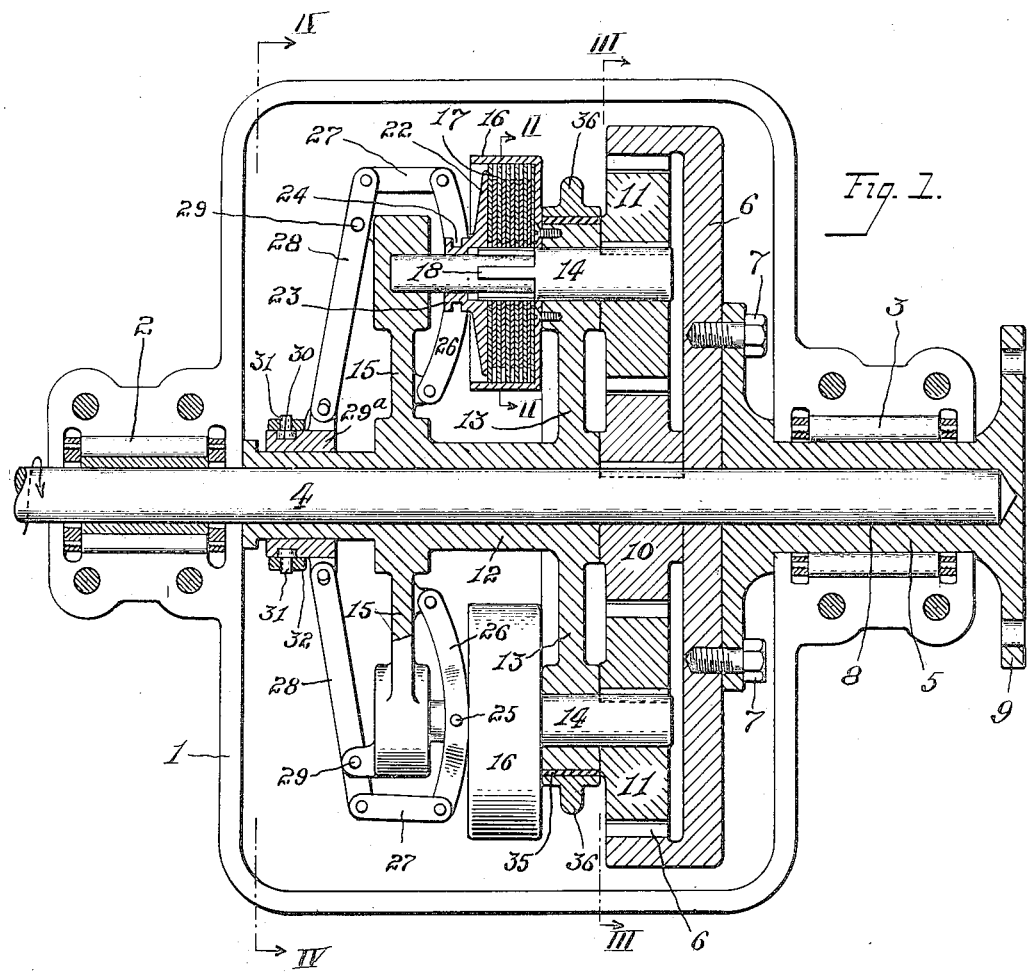
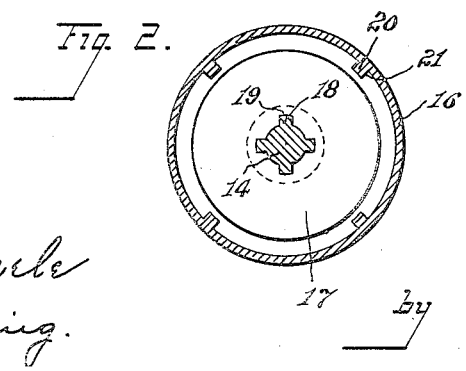

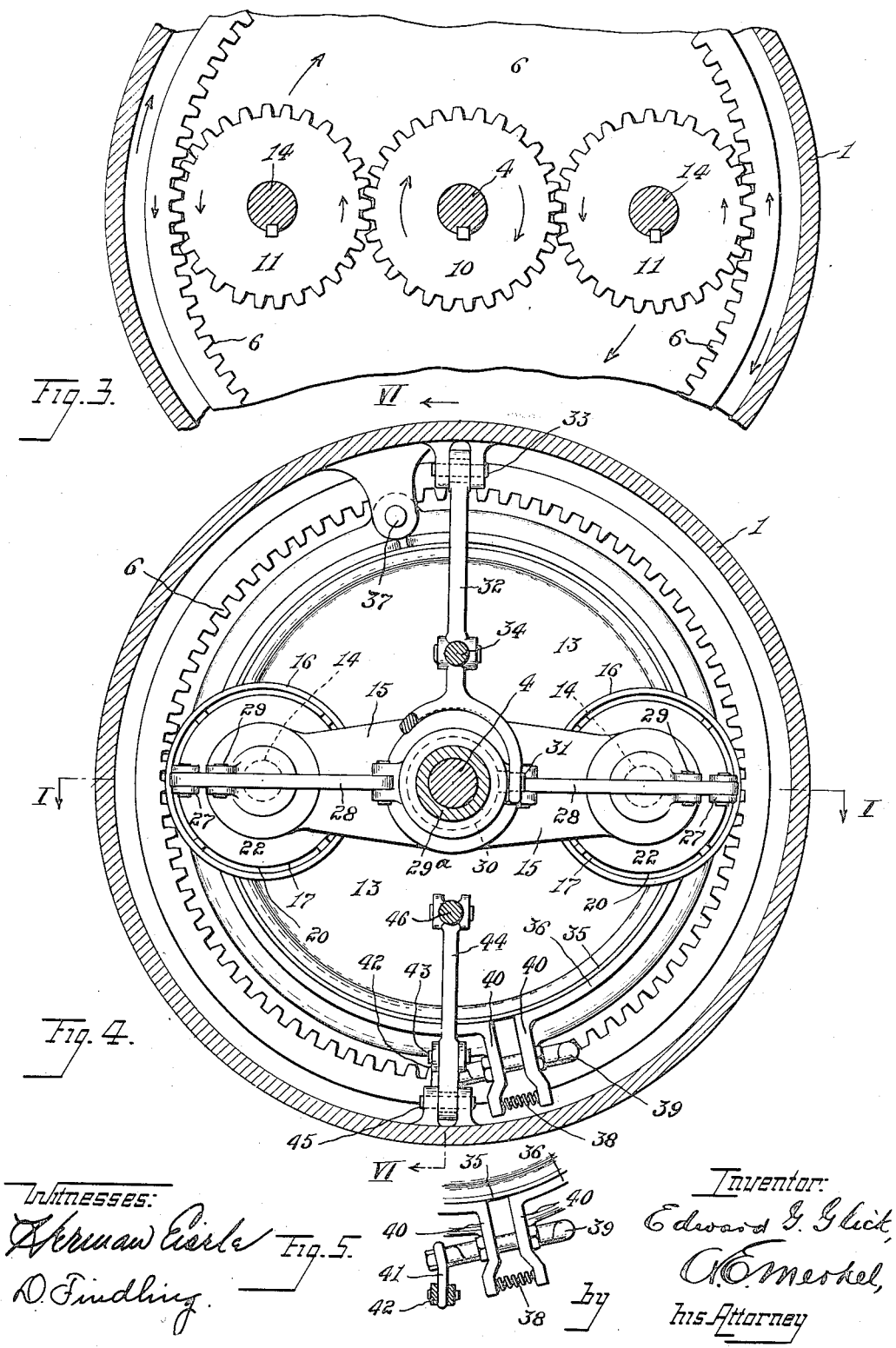

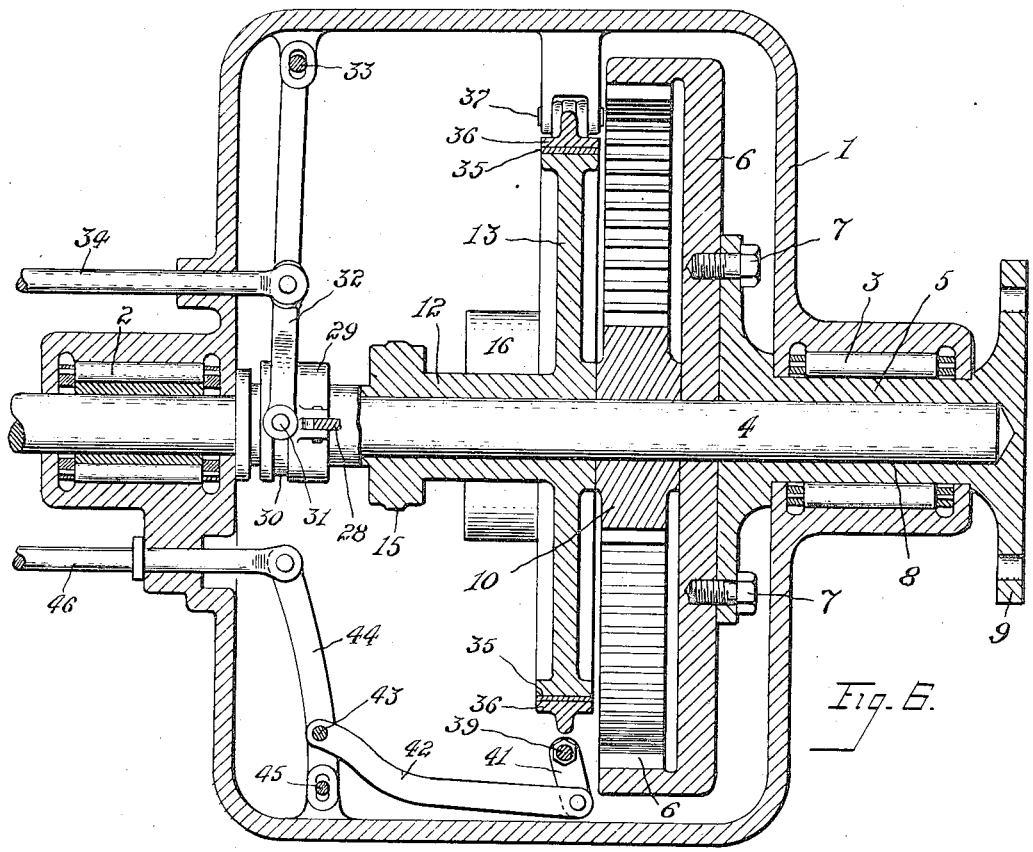
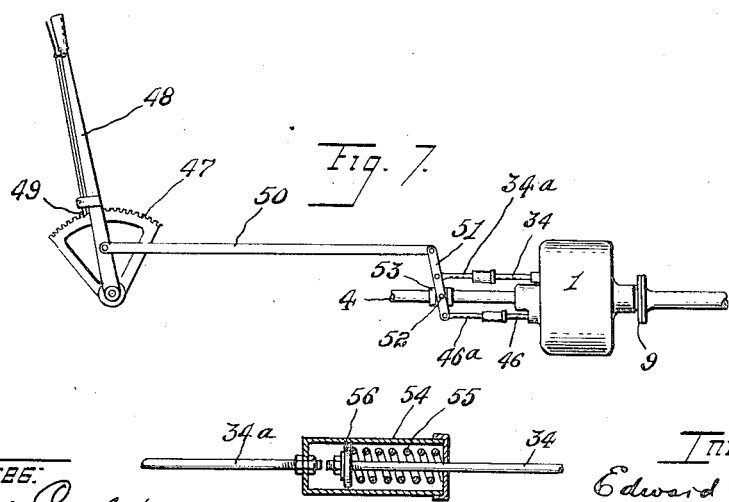

EDWARD G. GLICK, OF CLEVELAND, OHIO.

POWER-TRANSMITTING DEVICE.

1,210,461. Specification of Letters Patent. Patented Jan. 2, 1917.

Application filed July 20, 1914. Serial No. 852,066.

*To all whom it may concern:*

Be it known that I, EDWARD G. GLICK, a citizen of the United States, resident of Cleveland, county of Cuyahoga, and State of Ohio, have invented a new and useful Improvement in Power-Transmitting Devices, of which the following is a specification, the principle of the invention being herein explained and the best mode in which I have contemplated applying that principle, so as to distinguish it from other inventions.

My invention relates to power transmitting devices and particularly to that class of such devices which acts as a clutch.

The object of said invention is to provide a power transmitting device which may be used as a clutch and at the same time may be used for controlling the speed of rotation of the driven member, in an economical and efficient manner.

The said invention consists of means hereinafter fully described and particularly set forth in the claims.

The annexed drawings and the following description set forth in detail certain means embodying my invention, the disclosed means, however, constituting but one of various mechanical forms in which the principle of the invention may be applied.

In said annexed drawings:—Figure 1 represents an axial section of a device embodying my invention, parts thereof cut by the plane of section being shown in elevation. Fig. 2 represents a detail section taken on the plane indicated by line II—II in Fig. 1. Fig. 3 represents a transverse section, taken upon the plane indicated by line III—III and viewed in the direction indicated by the arrows in Fig. 1, of a fragmentary portion of the device. Fig. 4 represents a transverse section taken upon the plane indicated by line IV—IV in Fig. 1 and viewed in the direction indicated by the arrows. Fig. 5 represents a detail of one of the brakes forming an element of the device. Fig. 6 represents an axial section, taken upon a plane indicated by line VI—VI in Fig. 4. Fig. 7 represents a side elevation of a complete apparatus embodying my invention. Fig. 8 represents an axial section of a shock-absorbing device forming a detail part of the apparatus shown.

The illustrated embodiment of my invention comprises a casing 1 which is suitably fixed in any convenient position. Opposite sides of this casing are provided with roller bearings 2 and 3. Journaled in the bearing 2 is the driving shaft 4 and journaled in the bearing 3 is the driven member comprising, in this instance, the sleeve 5 and an internal gear 6 secured thereto by means of suitable screws 7, the said internal gear being located upon the interior of the casing, as shown. The shaft 4 extends axially through the gear 6 and into a cylindrical bore 8 of sleeve 5 in which it freely rotates. The sleeve 5 is provided with a suitable flange 9 by means of which it may be secured to a shaft or other part to be driven, and to which it is desired to transmit the power.

Keyed to the shaft and adjacent to the interior of the gear 6 is a pinion 10. This pinion meshes with two planetary gears 11, 11, the teeth of which latter engage the teeth of the internal gear 6, as shown in Fig. 1. Adjacent to the said pinion and rotatably mounted upon the shaft is a frame 12 formed with a disk 13, in the outer portion of which are rotatably mounted two diametrically opposite spindles 14. The planetary gears 11 are respectively keyed to the inner ends of these spindles. The opposite ends of the latter bear in two radially extending arms 15, 15, also forming part of the frame 12. Secured to said disk 13 and surrounding said spindles 14 respectively are two brake housings 16 which contain a set of disks 17 forming a multiple disk clutch. Each of the spindles is formed with tongues 18, Fig. 2, which engage slots 19 of alternate disks, and the housing is formed with tongues 20 which engage slots 21 formed in the outer peripheries of the other alternate set of disks, the first set of disks being of smaller external diameter and the second set of disks being of larger internal diameter as is customary in this class of devices. A sliding member 22 mounted upon each spindle engages the outermost of the disks and upon movement inwardly increases their frictional engagement in the usual manner. Each of these members 22 is formed with a hub 23 provided with a circumferential groove 24 engaged by diametrically and oppositely disposed pins 25 mounted in a pivotally supported yoke 26.

The outer end of each yoke articulates with a link 27 which articulates with a lever 28 fulcrumed at 29 on the arms, respectively, 15. The inner ends of the levers 28 articulate with a slidable sleeve 29 formed with a groove 30 engaged by pins 31. These latter are mounted upon a yoke 32 pivotally mounted at 33 on the interior of the casing 1, see Fig. 6, and articulating with the inner end of a shifting rod 34. It will therefore be seen that the movement of the rod 34 in the direction of the arrow in Fig. 6 will increase the frictional resistance in the brake disks and produce a braking action on the spindles 14 and correspondingly retard or tend to retard the rotation of the planetary gears 11 upon their axes.

Secured to the outer periphery of the disk 13 is a friction-band 35 and extending around this band is a brake-band 36 consisting of two members having a common pivot 37, see Fig. 4. A helical spring 38 tends to expand this band and a screw-member 39 engaging lugs 40 formed on the free ends of said band members respectively, draws these two members together and causes said band to contract as will be readily understood. A lever 41, Figs. 5 and 6, is secured to said screw-member and articulates with a link 42 pivotally connected at 43 with a lever 44. This latter is pivotally connected with the housing 1 at 45, its opposite or free end articulating with a shifting rod 46.

The above-described device operates as follows: Assuming the rod 34 to have been shifted so as to loosen the multiple disk clutches and thereby permit the planetary gears 11 to rotate freely upon their axes, the rod 46 to have been shifted so as to loosen the brake ring 36, and the direction of rotation of the driving shaft 4 to be that of the arrow shown in Fig. 1, it will be noted that the pinion 10 is driven in the same direction as the shaft, indicated also by large arrows in Fig. 3, and the planetary gears 11 will be driven in the direction indicated by the small arrows in said Fig. 3. These planetary gears will therefore run upon the internal gear 6 freely and rotate the frame 12 upon the shaft. Under these circumstances no motion will be transmitted to the internal gear 6 and sleeve 5 secured thereto. Let it now be assumed that the rod 34 has been shifted so as to bring the multiple disk brakes into operation and completely stop the rotation of the planetary gears upon their axes. This action will have the effect of fixing the planetary gears with reference to the pinion 10, and the frame 12 and internal gear 6 will be rotated at the same speed as that of the shaft and full shaft speed of rotation will therefore be transmitted in the direction indicated by the outer larger arrows in Fig. 3, that is, in the direction of shaft rotation. By now operating the rod 34 so as to slightly loosen the brake disks, the latter may be allowed to slip and the planetary gears thus allowed to rotate to a corresponding extent, upon their respective axes. This action it will be seen will have the effect of reducing the speed of rotation of the internal gear correspondingly. The said rod 34 may therefore be manipulated to obtain any required speed of rotation of the said internal gear varying between zero and speed of shaft rotation. When it is desired to reverse the direction of rotation of the internal gear 6, the rod 34 is operated so as to loosen the multiple disks and thus permit the planetary gears to rotate freely upon their own axes, and the rod 46 is then manipulated so as to tighten the brake ring 36 upon the disk 13 and thereby cause the rotation of the frame 12 to cease. The planetary gears 11, however, rotating freely, transmit their motion to the internal gear 6 and in the direction opposite that of shaft rotation, as is indicated by the small arrows on said gears in said Fig. 3.

The rods 34 and 46 may be so connected that they may be operated simultaneously to effect the above-described results, and in Fig. 7 I have illustrated one method of so connecting same. In this figure I have shown an ordinary toothed segment 47 and a hand lever 48 provided with a suitable pawl 49. Articulating with this lever is a rod 50 which articulates with a lever 51 pivoted at 52 to a collar 53 longitudinally fixed but rotatable with reference to the driving shaft 4. The rod 34 articulates with said lever 51 on one side of said collar and the rod 46 articulates with same upon the other side thereof. It will therefore be seen that the lever 48 may be shifted to such a position as will permit the multiple disk brakes to be inoperative and at the same time permit the brake ring 36 to be similarly inoperative. By now shifting the lever 48 in the direction indicated by the arrow in Fig. 7, the multiple disks are caused to engage and such movement of the lever may be continued so as to cause these disks to completely stop the rotation of the planetary gears 11 as previously described. The screw member 39 has its thread so arranged that this movement will still further loosen the brake-band 36. In this position the full shaft rotation is transmitted and by shifting the said lever 48 to various intermediate positions, the variation of such shaft rotation may be obtained as previously described. By now carrying the lever 48 over in the opposite direction, the multiple disk brakes are rendered inoperative and by continuing this movement of such lever, the brake-band 36 is brought into action, the rotation of the frame 13 stopped and the reversing position of the mechanism thus obtained.

In order to eliminate shock in the rods 34 and 46, a shock absorbing device may be interposed therein, such device being illustrated in Fig. 8. These devices consist of a cylinder 54 containing a coil-spring 55 interposed between a disk 56 secured to the end of the rods 34 and 36 respectively. The cylinder is fixed to additional rods (34ª and 46ª) which articulate with the lever 51.

Having fully described my invention, what I claim and desire to secure by Letters Patent is:—

1. In a device of the character described, the combination of a driving shaft; a driven member rotatably mounted directly upon said shaft and including an internal gear; a pinion fixed to said shaft; planetary gearing connecting said pinion and internal gear; a frame rotatably mounted directly upon said shaft and carrying said planetary gearing; and manually operated means controlling the speed of rotation of said planetary gearing independently of said driving shaft.

2. In a device of the character described, the combination of a driving shaft; a driven member rotatably mounted upon said shaft and including an internal gear; a pinion fixed to said shaft; planetary gearing connecting said pinion and internal gear; a frame rotatably mounted upon said shaft and carrying said planetary gearing; two multiple disk clutches respectively connected with each of the members of said planetary gearing, one multiple member of each of such clutches being fixed with relation to its respective gear and the other of the multiple members of each clutch being fixed with relation to said frame; and manually operated means for actuating said clutches to increase or decrease the degree of friction between the members thereof, whereby the speed of rotation of said planetary gearing may be varied.

3. In a device of the character described, the combination of a driving shaft; a driven member rotatably mounted directly upon said shaft and including an internal gear; a pinion fixed to said shaft; planetary gearing connecting said pinion and internal gear; a frame rotatably mounted directly upon said shaft and carrying said planetary gearing; multiple disk clutches for controlling the speed of rotation of said planetary gearing; and manually operable means for operating said clutches.

Signed by me, this 17th day of July, 1914.

EDWARD G. GLICK.

Attested by—
 HERMAN ESELE,
 ALAN E. KLEIN.